United States Patent
Distefano (10) Patent No.: US 11,794,820 B2
(45) Date of Patent: Oct. 24, 2023

(54) LATCHING MECHANISM FOR A CLOSURE PANEL USING MULTIPLE LATCHES

(71) Applicant: MAGNA CLOSURES INC., Newmarket (CA)

(72) Inventor: John Distefano, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 246 days.

(21) Appl. No.: 17/313,557

(22) Filed: May 6, 2021

(65) Prior Publication Data

US 2021/0354630 A1    Nov. 18, 2021

Related U.S. Application Data

(60) Provisional application No. 63/025,602, filed on May 15, 2020.

(51) Int. Cl.
*B62D 25/10* (2006.01)
*B60R 5/02* (2006.01)
*B62D 25/12* (2006.01)

(52) U.S. Cl.
CPC .............. *B62D 25/105* (2013.01); *B60R 5/02* (2013.01); *B62D 25/12* (2013.01)

(58) Field of Classification Search
CPC ...... B60J 5/04; B60J 5/10; B60R 5/02; B60R 5/04; B62D 25/10; B62D 25/105; B62D 25/12; E05B 83/16; E05B 83/24; E05D 15/50
USPC ............................ 296/37.1, 37.16, 50, 51, 76
See application file for complete search history.

(56) References Cited

U.S. PATENT DOCUMENTS

| | | |
|---|---|---|
| 2,246,792 A | 6/1941 | Dall |
| 2,296,424 A | 9/1942 | Claud-Mantle |
| 2,311,965 A | 2/1943 | Reynolds |
| 2,572,630 A | 10/1951 | Krause |
| 2,620,889 A | 12/1952 | McCormick |
| 2,641,017 A | 6/1953 | Claud-Mantle |
| 2,654,116 A | 10/1953 | Claud-Mantle |
| 2,656,562 A | 10/1953 | Phillips |
| 2,709,611 A | 5/1955 | Claud-Mantle |
| 2,709,832 A | 6/1955 | Claud-Mantle |
| 2,785,921 A | 3/1957 | Barenyi |

(Continued)

FOREIGN PATENT DOCUMENTS

| | | |
|---|---|---|
| CN | 105121765 A | 12/2015 |
| CN | 108979365 A | 12/2018 |

(Continued)

*Primary Examiner* — Jason S Daniels (57) ABSTRACT

A latching mechanism for facilitating opening and closing of a closure panel of a vehicle, comprising: a first latch mounted in a first location, the first location positioned on a first side of the vehicle, the first latch coupling the closure panel to the body of the vehicle when engaged with a corresponding first mating latch component; a second latch mounted in a second location, the second location positioned on a second side of the vehicle, the second latch coupling the closure panel to the body of the vehicle when engaged with a corresponding second mating latch component; wherein one of the first latch and the second latch is maintained in a latched state and the other of the first latch and the second latch is in an unlatched state when the closure panel is moved between an open position and a closed position.

17 Claims, 9 Drawing Sheets

(56) References Cited

U.S. PATENT DOCUMENTS

| | | | |
|---|---|---|---|
| 3,572,821 A * | 3/1971 | Van Antwerp | B60J 7/1621 |
| | | | 296/100.02 |
| 4,479,675 A | 10/1984 | Zankl | |
| 5,651,164 A | 7/1997 | Demarco | |
| 5,725,065 A | 3/1998 | Knurr et al. | |
| 6,357,815 B1 | 3/2002 | Queveau et al. | |
| 6,568,495 B1 | 3/2003 | Corder et al. | |
| 7,234,757 B2 | 6/2007 | Mitchell | |
| 10,871,018 B1 * | 12/2020 | Emerson | B60J 5/047 |
| 11,208,046 B2 * | 12/2021 | Liu | B62D 25/087 |
| 2010/0181795 A1 * | 7/2010 | Papanikolaou | B62D 33/037 |
| | | | 296/57.1 |
| 2011/0031771 A1 | 2/2011 | Ding | |
| 2015/0191943 A1 * | 7/2015 | Tieman | E05B 85/26 |
| | | | 292/195 |

FOREIGN PATENT DOCUMENTS

| | | | | |
|---|---|---|---|---|
| CN | 109267862 A | | 1/2019 | |
| CN | 109881999 A | | 6/2019 | |
| CN | 110094119 A | | 8/2019 | |
| CN | 110195535 A | | 9/2019 | |
| CN | 110439393 A | | 11/2019 | |
| DE | 19507427 A1 * | 9/1996 | | B60J 5/047 |
| JP | S5733869 U | | 2/1982 | |

* cited by examiner

LATCHING MECHANISM FOR A CLOSURE PANEL USING MULTIPLE LATCHES

CROSS-REFERENCE TO RELATED APPLICATION

This application claims priority from the benefit of the filing date of U.S. Provisional Patent Application No. 63/025,602 filed on May 15, 2020, entitled "LATCHING MECHANISM FOR A CLOSURE PANEL USING MULTIPLE LATCHES", the contents of which are herein incorporated by reference.

FIELD

This disclosure relates to latching mechanisms for a closure panel.

BACKGROUND

Some vehicles are equipped with a closure panel, such as a lift gate, which is driven between an open position (position 2) and a closed position (position 1) using an electrically driven lift or opening system. Disadvantages of the current systems include bulky form factors which take up valuable vehicle cargo space, for example, occupying space along the vertical supports delimiting the opening and access to a rear liftgate or what is commonly referred to as a frunk (a storage space accessed via a front hood of a battery powered vehicle). As such, the current systems can tend to limit the size of access through the opening and into the interior cargo space, require additional lift support systems in tandem such as gas struts and other counterbalance mechanisms, have an unacceptable impact on manual open and close efforts requiring larger operator applied manual force at the panel handle, and/or temperature effects resulting in variable manual efforts required by the operator due to fluctuations in ambient temperature.

Further, conventional opening hoods, trunks and liftgates do not accommodate convenient curbside access. In addition, items stored towards the back of the storage compartment can be difficult to access from the front of the vehicle. As EVs become more popular, the use of frunks will become more prevalent. Accordingly, the ability to access the compartment (e.g. storage) other than directly from in front of the compartment is desirable. Additionally, new power actuated opening and closing systems are desired, which also do not inhibit access to the compartment.

SUMMARY

It is an object of the present invention to provide a latching mechanism that obviates or mitigates at least one of the above presented disadvantages.

One aspect provided is a latching mechanism for facilitating opening and closing of a closure panel of a vehicle, the latch mechanism comprising: a first latch mounted in a first location to one of a body of the vehicle and the closure panel, the first location positioned on a first side of the vehicle, the first latch coupling the closure panel to the body of the vehicle when engaged with a corresponding first mating latch component; a second latch mounted in a second location to one of the body and the closure panel, the second location positioned on a second side of the vehicle, the second latch coupling the closure panel to the body of the vehicle when engaged with a corresponding second mating latch component; wherein one of the first latch and the second latch is maintained in a latched state and the other of the first latch and the second latch is in an unlatched state when the closure panel is moved between an open position and a closed position.

A second aspect provided is a method for operating a latching mechanism for facilitating opening and closing of a closure panel of a vehicle, the method comprising the steps of: unlatching a first latch mounted in a first location to one of a body of the vehicle and the closure panel, the first location positioned on a first side of the vehicle, the first latch coupling the closure panel to the body of the vehicle when engaged with a corresponding first mating latch component; and maintaining a latched state of a second latch mounted in a second location to one of the body and the closure panel, the second location positioned on a second side of the vehicle, the second latch coupling the closure panel to the body of the vehicle when engaged with a corresponding second mating latch component; wherein the closure panel is moved between an open position and a closed position while the second latch is maintained in the latched state.

A third aspect provided is a control system for operating a latching mechanism for a closure panel of a vehicle, the latching mechanism having a first latch mounted to one of a body of the vehicle and the closure panel on a first side of the vehicle and a second latch mounted to one of the body and the closure panel on a second side of the vehicle, the control system having: a controller for coordinating the release of the first latch to an unlatched state while providing for the second latch in a latched state; a first side control coupled to the controller for operating the first latch; and a second side control coupled to the controller for operating the second latch; wherein the second latch is maintained in the latched state and the first latch is in the unlatched state when the closure panel is moved between an open position and a closed position.

A further aspect provided is the control system, wherein the first latch and the second latch each have a power release actuator for operating the first latch and the second latch as elatches.

A further aspect provided is the control system, wherein a signal connection between the controller and the first side controller is a wireless connection.

A further aspect provided is the control system, wherein a signal connection between the controller and the first side controller is a wired connection.

A further aspect provided is the control system, wherein a signal connection between the controller and the second side controller is a wireless connection.

A further aspect provided is the control system, wherein a signal connection between the controller and the second side controller is a wired connection.

A further aspect provided is the control system, wherein the controller is configured to operate an actuator mechanism coupled between the body and the closure panel in an intermediate location between the first side and the second side, the actuator mechanism for facilitating movement of the closure panel between the open position and the closed position.

A further aspect provided is the control system, wherein a ratchet of the second latch retains a mating latch component in a slot as the mating latch component pivots about a pivot axis of the slot.

Other aspects, including methods of operation, and other embodiments of the above aspects will be evident based on the following description and drawings.

BRIEF DESCRIPTION OF THE DRAWINGS

Reference is made, by way of example only, to the attached figures, wherein.

DETAILED DESCRIPTION OF EXAMPLE EMBODIMENTS

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments. Likewise, use of a plural form in reference to an item is not intended to exclude the possibility of including one of the item in some embodiments. It will be apparent to one skilled in the art in at least some instances in this specification and the attached claims that it would be possible to include one of the item in at least some embodiments.

In the following description, details are set forth to provide an understanding of the disclosure. In some instances, certain software, circuits, structures, techniques and methods have not been described or shown in detail in order not to obscure the disclosure. The term "controller" is used herein to refer to any machine for processing data, including the data processing systems, computer systems, modules, electronic control units ("ECUs"), microprocessors or the like for providing control of the systems described herein, which may include hardware components and/or software components for performing the processing to provide the control of the systems described herein. A computing device is another term used herein to refer to any machine for processing data including microprocessors or the like for providing control of the systems described herein. The present disclosure may be implemented in any computer programming language (e.g. control logic) provided that the operating system of the control unit provides the facilities that may support the requirements of the present disclosure. Any limitations presented would be a result of a particular type of operating system or computer programming language and would not be a limitation of the present disclosure. The present disclosure may also be implemented in hardware or in a combination of hardware and software.

Figure 1:
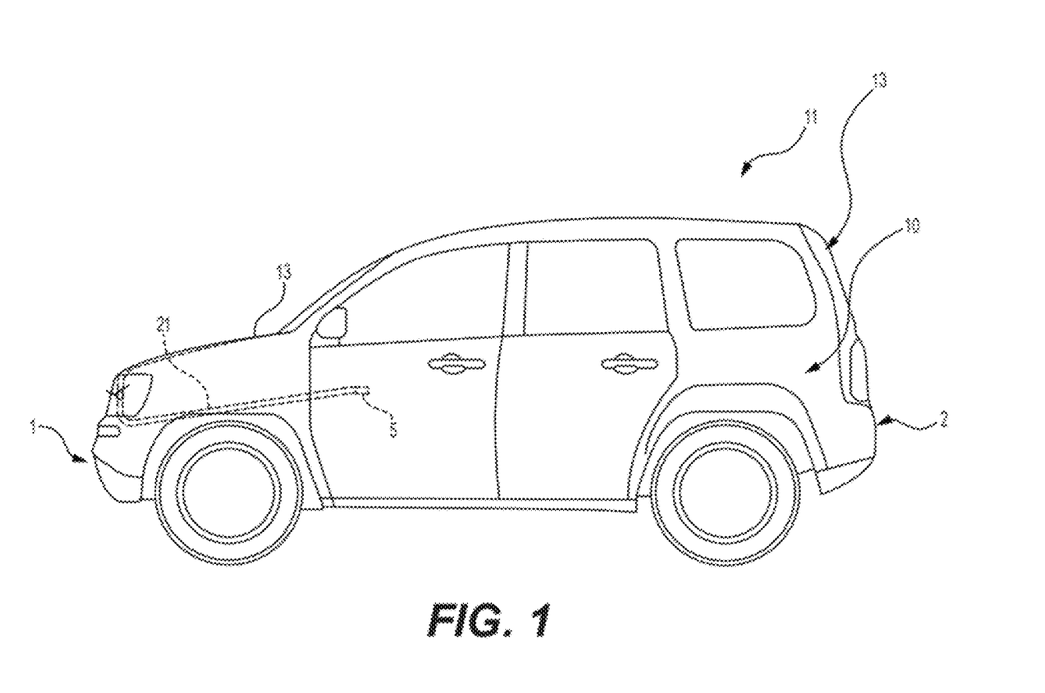
FIG. 1 is a side view of a vehicle with one or more closure panels.
Figure 2:
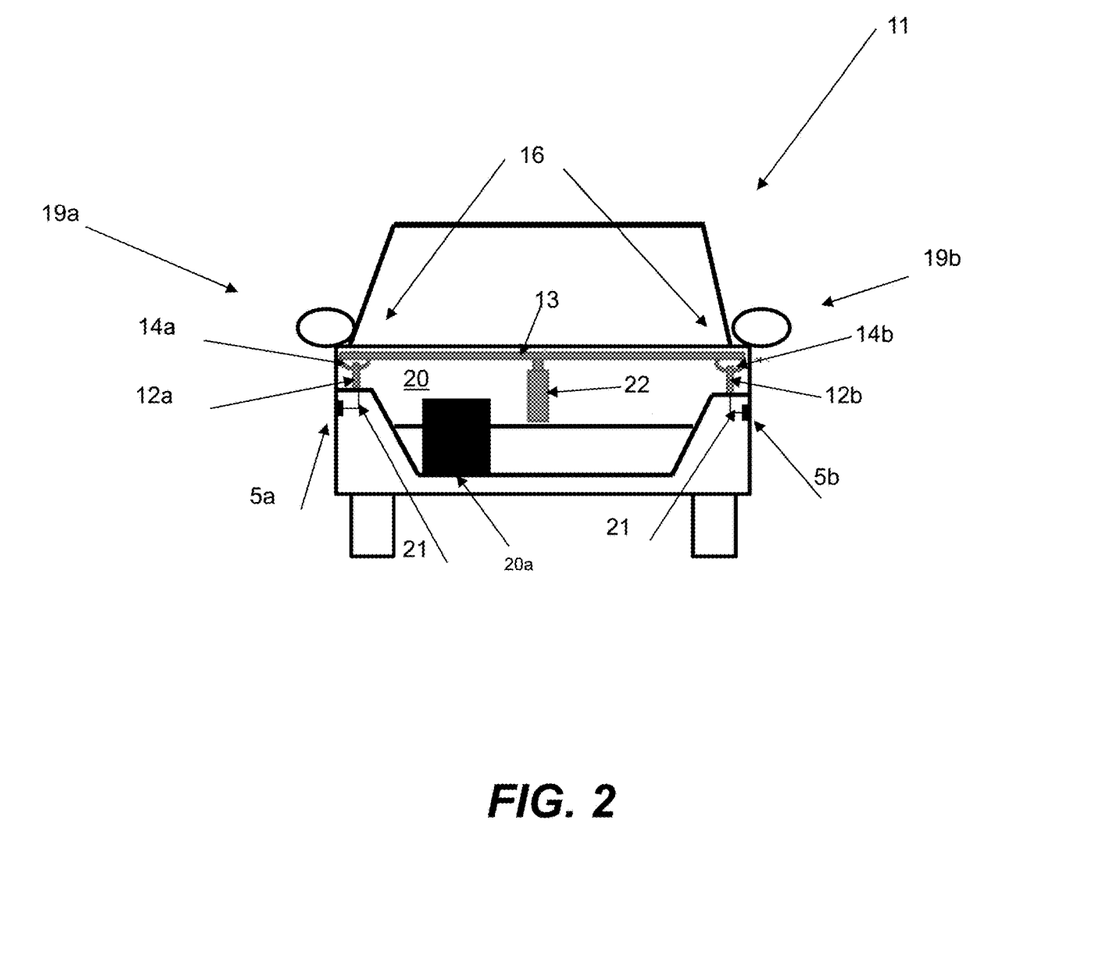
FIG. 2 is a front view of a vehicle with one or more closure panels illustrating a latching mechanism operated as a hinge and a latch.
Figure 5:
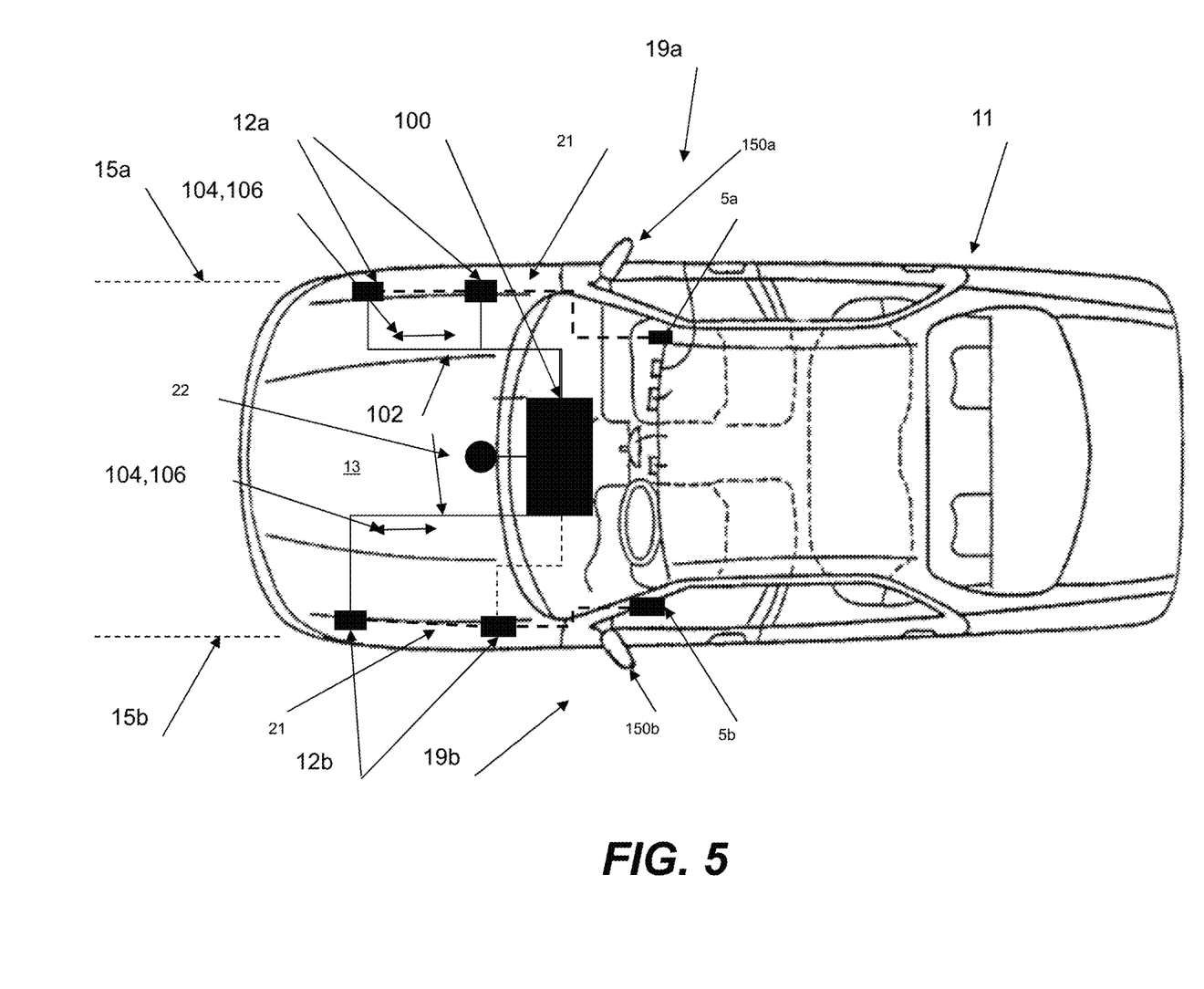
FIG. 5 shows a top perspective view of an alternative embodiment of the latching mechanism of FIG. 2.

Referring to FIGS. 1 and 2, provided is a latching system 16 (e.g. having two or more latches 12a,b—see FIGS. 3 and 5 embodiments by example only) for engaging with corresponding mating latch components 14, e.g. strikers. In one embodiment, as shown, the latches 12a,b are mounted to a body 10 of a vehicle 11, while the mating latch components 14 are mounted on a closure panel 13 (e.g. a hood). In an alternative embodiment, the latches 12 can be mounted (e.g. in a first location 8a and a second location 8b—see FIG. 3) to the closure panel 13 of the vehicle 11, while the mating latch components 14 are mounted on the body 10. Location 8a can be referred to as being on a first side 19a of the vehicle 11, while the location 8b can be referred to as being on a second side 19b of the vehicle 11, such that the first side 19a of the vehicle 11 and the second side 19b of the vehicle 11 are opposed (e.g. n opposite sides) to one another. Similarly, the first location 8a and the second location 8b are opposed to one another.

The vehicle 11 has a plurality of latch controls (e.g. button, switch, proximity sensor of a mechanical handle, etc.) 5 (e.g. 5a, 5b) for controlling selected latches 12 of the latching system 16, as further described below. Each of the latch controls 5a, 5b can be connected to their respective portion of the latches 12 of the latching system 16 by a respective connection 21 (e.g. Bowden Cable, electrical signal cable, and/or wireless connection—for example in relation to an appropriately configured wireless transmitter such as a FOB). For example, each latch control 5a, 5b can be located in separate locations of the vehicle 11 (e.g. on either side 19a, 19b of the vehicle body 10 for convenient access to either the operator 3 or passenger 4—see FIGS. 3, 4—of the vehicle 11). In addition, the vehicle 11 has a front end 1 and a back end 2, such that the sides 19a, 19b extend between the front end 1 and the back end 2.

On example of the latch controls 5 is open buttons 5a, 5b provided on each respective side 19a, 19b. The open buttons 5a, 5b could be configured similarly to that of a power open/release button (not shown) used to operate a lift gate 13 latch. For example a button 5a,5b could be on the side mirrors 150a, 150b, underneath. The latch controls 5a,5b could be connected to a controller 100 of the vehicle 11 to open a respective latch 12a,12b that the user (e.g. operator 3 or passenger 4) is on. In another possibly configuration, an obstacle detection system, which may include radar, capacitive, optical, or ultrasonic sensors may be associated with each side 19a, 19b for detecting a person adjacent the side 19a, 19b, for example for detecting a person adjacent the front fenders as one example. Such obstacle detection sensors may be in communication with the controller 100 which determines when the controller 100 receives an open signal command from a wireless FOB key for example indicating to the controller 100 a user's intent to have the closure panel 13 opened for access to the storage space from one of the sides 19a, 19b, and detection of a user on one of the sides 19a, 19b, the controller 100 may proceed to unlatch the latches 12 of the side 19a, 19b on which a user has been detected using the obstacle detection system and optionally further control the actuator mechanism 22. It is recognized other manners for detecting a user on one of the sides 19a, 19b may be utilized, such as by detecting the proximity or position of the wireless key FOB about the sides 19a, 19b.

As shown in FIG. 2, the closure panel 13 can be used to cover an internal (e.g. storage) space 20 of the vehicle 11, and therefore as such can be used to provide for controlled closure and access to the space 20 (e.g. containing luggage 20a) as facilitated by the latching system 16. As further described below, operation of the closure panel 13 between an open position (see FIGS. 3, 4) and a closed position (see FIG. 2) can be assisted by an actuator mechanism 22 of the latching system 16. It is also recognised that opening and closing of the closure panel 13 can be performed manually by a user of the vehicle 11. It is recognised that in the closed position the respective latch 12a, 12b can provide that the corresponding striker 14a,b and associated ratchet 40 to act as a pivot point for when moving the closure panel 13 between the open and closed positions (see FIGS. 2, 3 and 4).

In view of the above, the latching system 16 be used advantageously with vehicle closure panels 13 to provide for open and close operations for the closure panel(s) 13 of vehicles 11. Other applications of the latching system 16, in general for closure panels 13 both in and outside of vehicle applications, include advantageously assisting in optimization of overall hold and manual effort forces for closure panel 13 operation. It is recognized as well that the latching system 16 examples provided below can be used advantageously as the sole means of open and close assistance for closure panels 13 or can be used advantageously in combination (e.g. in tandem) with other closure panel 13 biasing members (e.g. spring loaded hinges, biasing struts, etc.). In particular, the latching system 16 can be used to provide or otherwise assist in a holding force (or torque) for the closure panel 13. Further, it is recognized that the latching system 16 can be facilitated in conjunction with a portion of the latches 12 12 operating as hinges (see FIGS. 3, 4) of the closure panel 13, as further described below.

Referring again to FIGS. 1 and 2, shown is the vehicle 11 with the vehicle body 10 having one or more closure panels 13. For vehicles 11, the closure panel 13 can be referred to as a partition or door, typically operated in a hinged fashion, but sometimes attached by other mechanisms such as tracks, in front of an opening which is used for entering and exiting the vehicle 11 interior by people and/or cargo (e.g. luggage). It is also recognized that in some applications, the closure panel 13 could be used as an access panel for vehicle 11 systems such as engine compartments and also for traditional trunk compartments of automotive type vehicles 11.

The closure panel 13 can be opened to provide access to the space 20, or closed to secure or otherwise restrict access to the space 20. For example decklids, frunks (e.g. front trunk), hoods, tailgates can be referred to as the closure panel 13. Also closure panel 13 can be for a center console with hinged lid configuration, glove compartments, pickup truck covers, windows and the like. It is also recognized that there can be one or more intermediate hold positions of the closure panel 13 between a fully open position and fully closed position, as provided at least in part by the actuator mechanism 22. For example, the actuator mechanism 22 can assist in biasing movement of the closure panel 13 away from one or more intermediate hold position(s), also known as Third Position Hold(s) (TPHs) or Stop-N-Hold(s), once positioned therein. It is also recognized that the actuator mechanism 22 can be provided as a component of a closure panel 13 assembly, as desired.

An actuator mechanism 22 (e.g. see FIG. 9) can be coupled between the body 10 and the closure panel 13 in a third location 8c, the third location 8c between the first location 8a and the second location 8b, the actuator mechanism 22 for facilitating movement of the closure panel 13 between the open position and the closed position.

Figure 9:
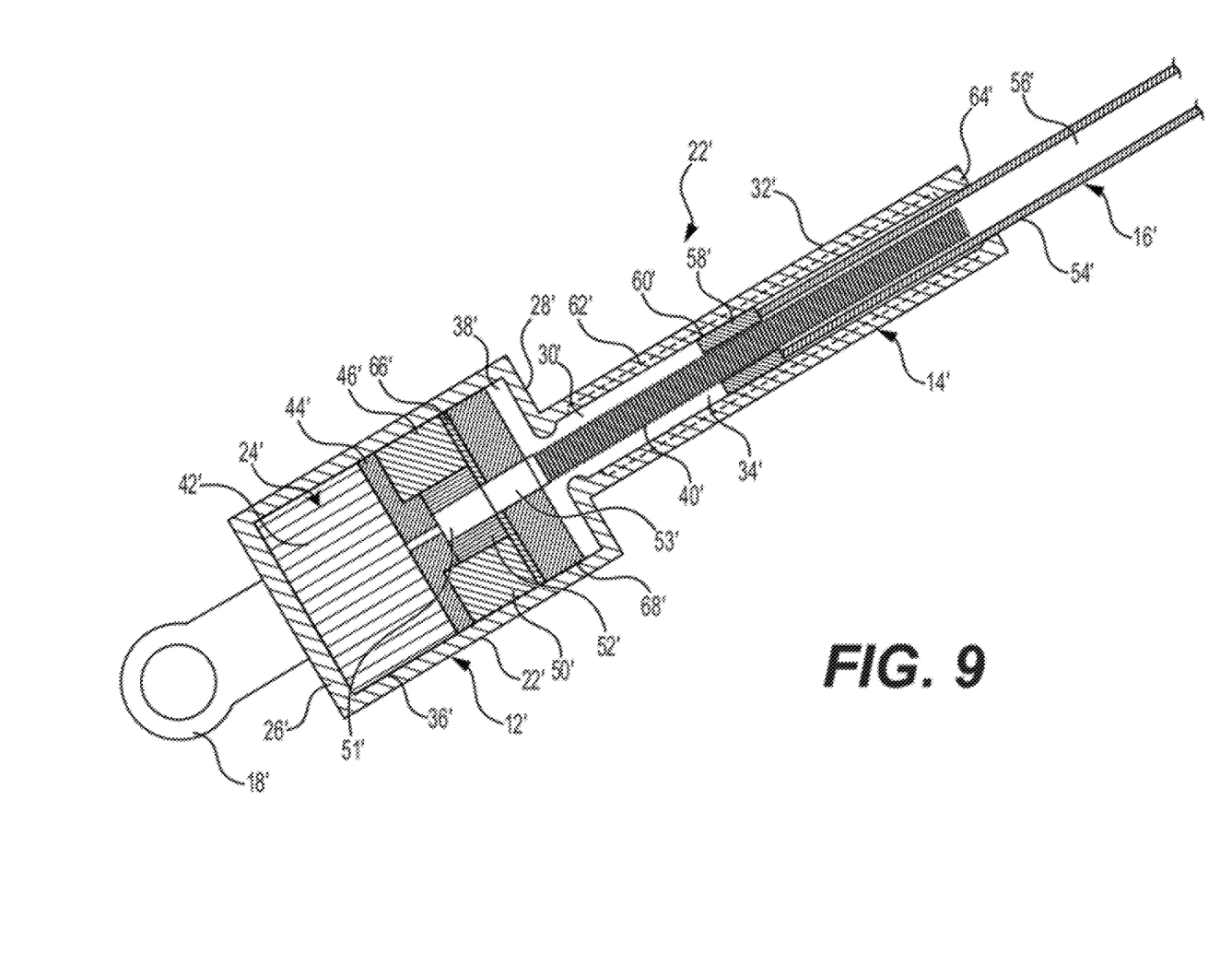
FIG. 9 is an example actuator mechanism of FIG. 2.

The closure panel 13 can be opened manually and/or powered electronically via the latching mechanism 16, where powered closure panels 13 can be found on minivans, high-end cars, or sport utility vehicles (SUVs) and the like. Additionally, one characteristic of the closure panel 13 is that due to the weight of materials used in manufacture of the closure panel 13, some form of force assisted open and close mechanism (or mechanisms), such as the actuator mechanism 22, are used to facilitate operation of the open and close operation by an operator (e.g. vehicle driver) of the closure panel 13. The force assisted open and close actuator mechanism(s) 22 can be provided by torsion element(s), a motor, and/or any biasing members external to the latching mechanism 16 (e.g. spring loaded hinges, spring loaded struts, gas loaded struts, electromechanical struts, etc.), as desired, when used as part of the closure panel 13 assembly. An example of the actuator assembly 22 is shown in FIG. 9, as further described below.

Figure 3:
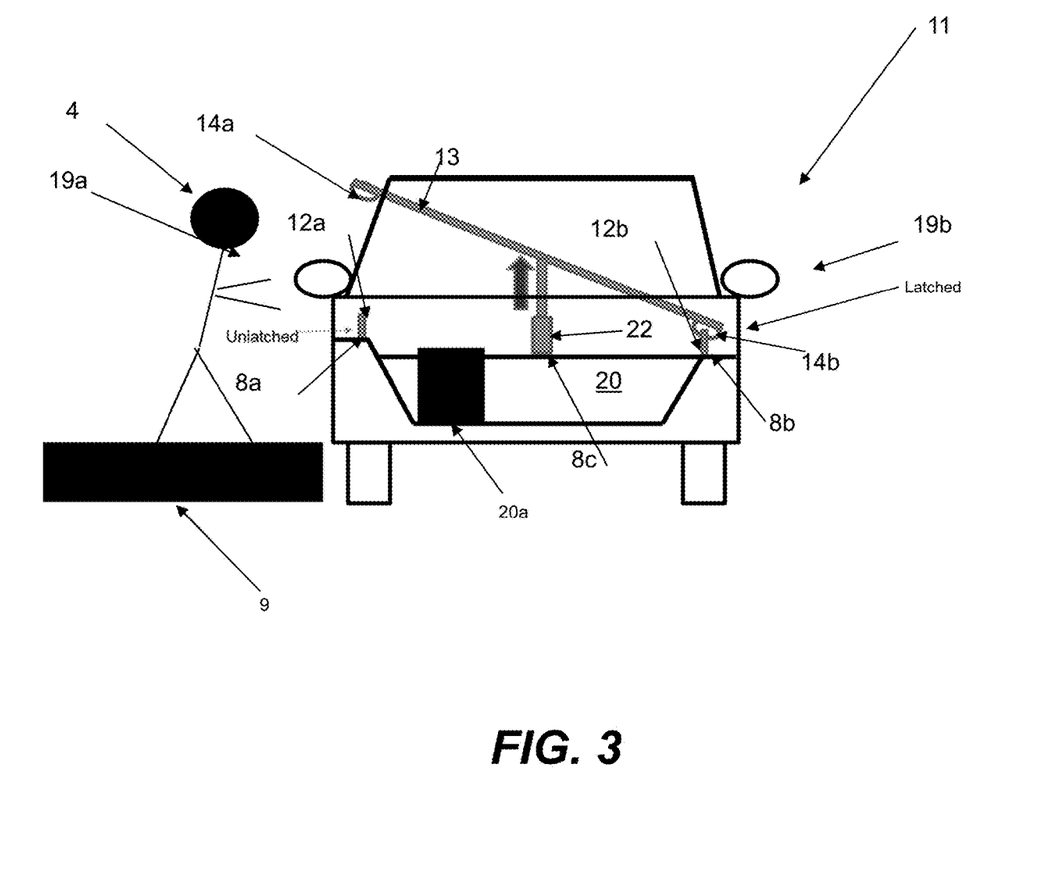
FIG. 3 is a first operation of the latching mechanism of FIG. 2.
Figure 4:
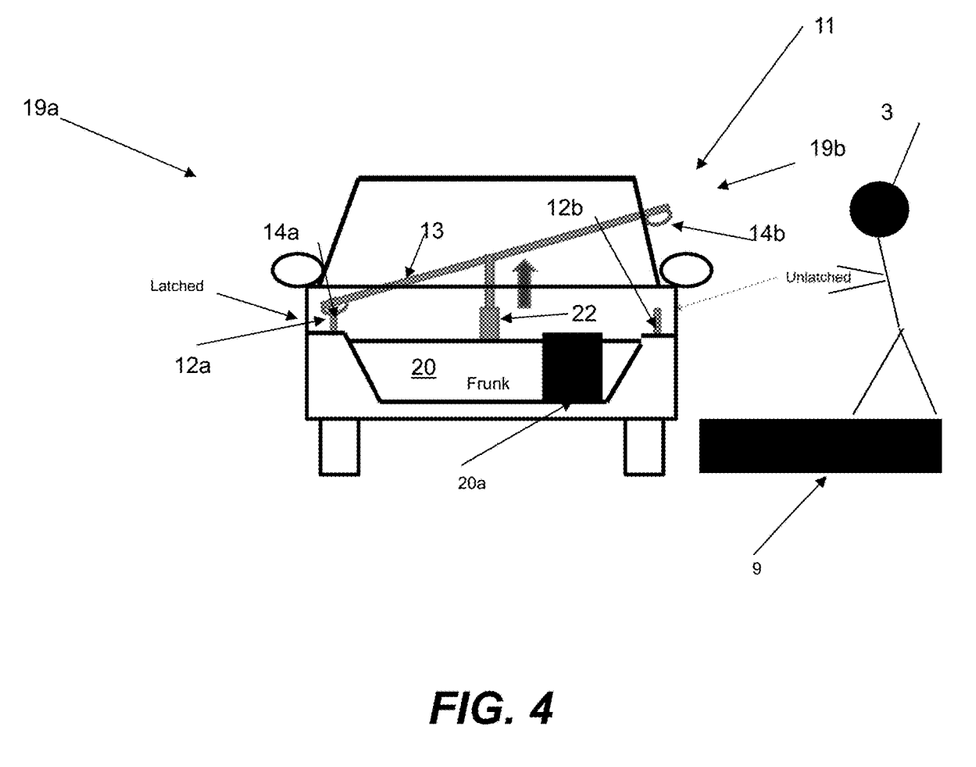
FIG. 4 is an alternative operation of the latching mechanism of FIG. 2.

Referring again to FIG. 5, in the context of a vehicle 11 application of a closure panel 13 by example only, the closure panel 13 is movable between a closed position (see FIG. 2) and multiple open positions (shown FIGS. 3, 4). In the embodiment shown, the closure panel 13 pivots between the open positions and the closed position about corresponding separate pivot axes 15a, 15b, which can be configured as horizontal or otherwise parallel to a support surface 9 (e.g. curb) of the vehicle 10. In other embodiments, the pivot axis 15a,b may have some other orientation such as vertical or otherwise extending at an angle outwards from the support surface 9 of the vehicle 10.

Figure 8:
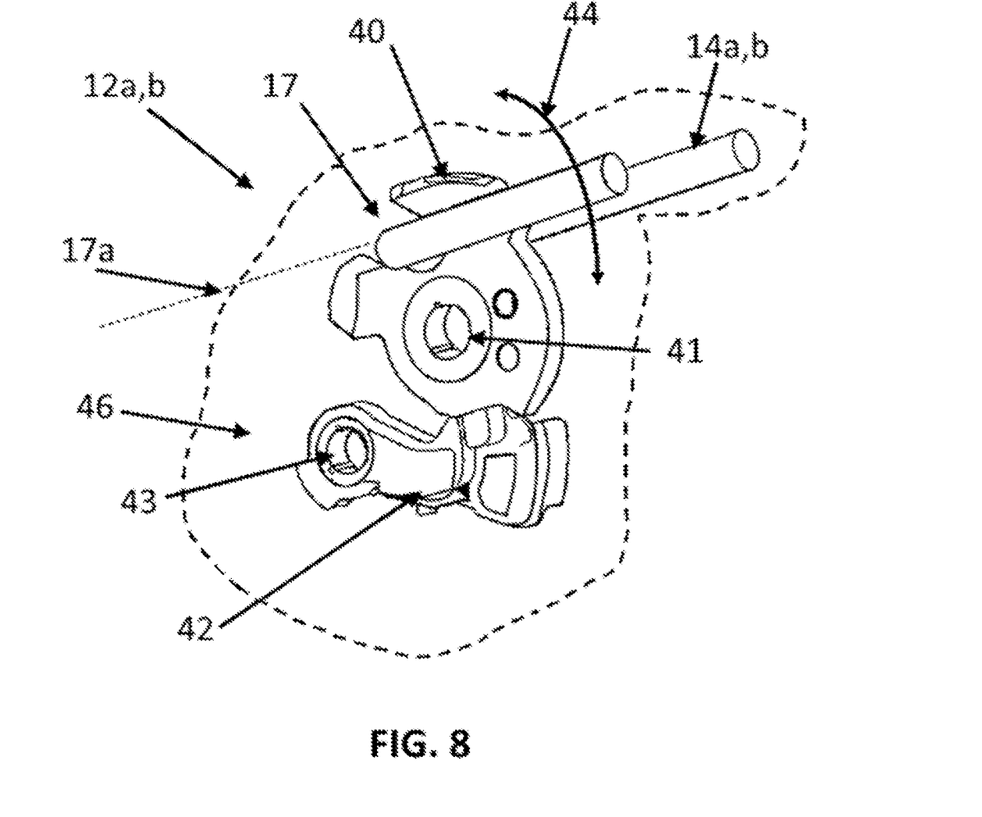
FIG. 8 is an example latch configuration of the latching mechanism of FIG. 2.

Referring to FIG. 8, shown is an example latch 12 including a ratchet 40 and a pawl 42, such that the pawl 42 retains the ratchet 40 in a latched position (i.e. holding the mating latch component 14a.b within a slot 17 of the ratchet 40). The ratchet 40 pivots about a ratchet pivot axis 41 and the pawl 42 pivots about a pawl pivot axis 43, for example, as the latch 12 is operated between the latched position (shown) and an unlatched position (i.e. when the mating latch component 14 is allowed to exit the slot 17—see also FIGS. 3 and 4). The ratchet 40 and the pawl 42 are mounted to a latch frame 46 (e.g. by pins not shown), shown in ghosted view by example. It is recognized that the latch 12 is mounted to the closure panel 13 or the vehicle body 10 by the latch frame 46. For example, it is recognized that movement of the pawl 42 about the pawl pivot 43 (e.g. by operation of a controller 100—see FIG. 5—such as by example a vehicle controller module as is known in the art) causes the pawl 42 to disengage from the ratchet 40 and thus facilitate the ratchet 40 to pivot about the ratchet pivot 41 and thus allow the mating latch component 14 to exit the slot 17. Similarly, restricting movement of the pawl 42 about the pawl pivot 43 (e.g. by a pawl biasing element such as a torsion spring as is known in the art) causes the pawl 42 to maintain engagement with the ratchet 40 and thus inhibit the ratchet 40 to pivot about the ratchet pivot 41 and thus retain the position of the mating latch component 14 within the slot 17. As discussed above, while retained in the slot 17, the mating latch component 14 can pivot about the pivot axis 17a while the closure panel 13 is moved between the open and closed positions (e.g. by the actuator mechanism 22).

The configuration of the latch of FIG. 8 corresponds to the latch 12b state shown in FIG. 2 and the latch 12a state shown in FIG. 3, such that the mating latch component 14 pivots 44 about a pivot axis 17a in the slot 17, as the closure panel 13 moves between the open and closed positions. For ease of explanatory purposes only, the closure panel 13 and the body 11 of the vehicle 11 are not shown in FIG. 8.

Referring again to FIG. 5, the controller 100 can be connected to the latches 12 of the latching system 16 by signal connections 102 (e.g. conductive wires, wireless), such that control signals 104 issued by the controller 100 as well as received sensor signals 106 (e.g. position sensors not shown) can be used by the controller to operate the latches as e-latches (e.g. containing one or more motors—not shown—used to actuate the movements of the pawl 42 and/or ratchet 40 of each latch 12 respectively). In the case of elatches 12a,b, the signal connections 102 could also be wireless.

In view of the above, it is recognised that the latches 12a,b of the latching system 16 are selectively operated (e.g. by the latch controls 5a, 5b and/or the controller 100) in order to effectively select which side 19a, 19b the closure panel 13 is to open. In other words, certain latch(es) 12a,b of the latching system 16 are operated in a latched state (e.g. latch 12b of FIG. 3 or latch 12a of FIG. 4) for a selected side (e.g. 19b or 19a respectively) while other latch(es) 12a,b of the latching system 16 are operated in an unlatched state (e.g. latch 12a of FIG. 3 or latch 12b of FIG. 4) for a selected side (e.g. 19a or 19b respectively). In this manner, while one side 19a,b has the latch(es) 12a,b in an unlatched state, the other side 19a,b has the latch(es) 12a,b in a latched state. In this manner, those latch(es) 12a,b in the latched state (e.g. see latch 12b of FIG. 3) act as hinge(s) (for pivoting of the closure panel 13 about the pivot axis 15a,b—see FIG. 5) during operation of the closure panel 13 between the open and closed positions. While selected latch(es) 12a,b are in the latched state, other(s) of the latch(es) 12a,b in the unlatched state (e.g. see latch 12a of FIG. 3) act to release their respective mating latch component(s) 14 from their respective slot 17 to facilitate operation of the closure panel 13 from the closed to the open position. Further, as shown in FIG. 2, when both sides 19a, 19b of the latching mechanism 16 have their latches 12a,b in the latched state, then the closure panel 13 is in the closed (e.g. locked) position. It is therefore anticipated that during normal operation of the closure panel 13, only one side 19a (or the other side 19b) would have their latch(es) 12a,b in the unlatched state, in order to facilitate a simulated hinged operation of the closure panel 13 when moving between the open and closed positions.

In view of the above, the latching mechanism 16 provides a side 19a,b opening closure panel 13 that can be selectively opened from either side 19a,b of the vehicle 11, thereby advantageously providing the access while at the same time inhibiting obstructions to the access due to side mounted struts, counterbalance mechanisms, hinges, etc.

Further, the latching mechanism 16 also provides for the configuration of an intermediately (e.g. centrally) mounted actuator mechanism 22 (e.g. a vertically positioned power strut) that can be used to assist in raising and lowering the closure panel 13, while at the same to inhibiting loading/unloading obstruction with respect to side 19a,b access to the storage 20 via the opened closure panel 13.

Figure 6:
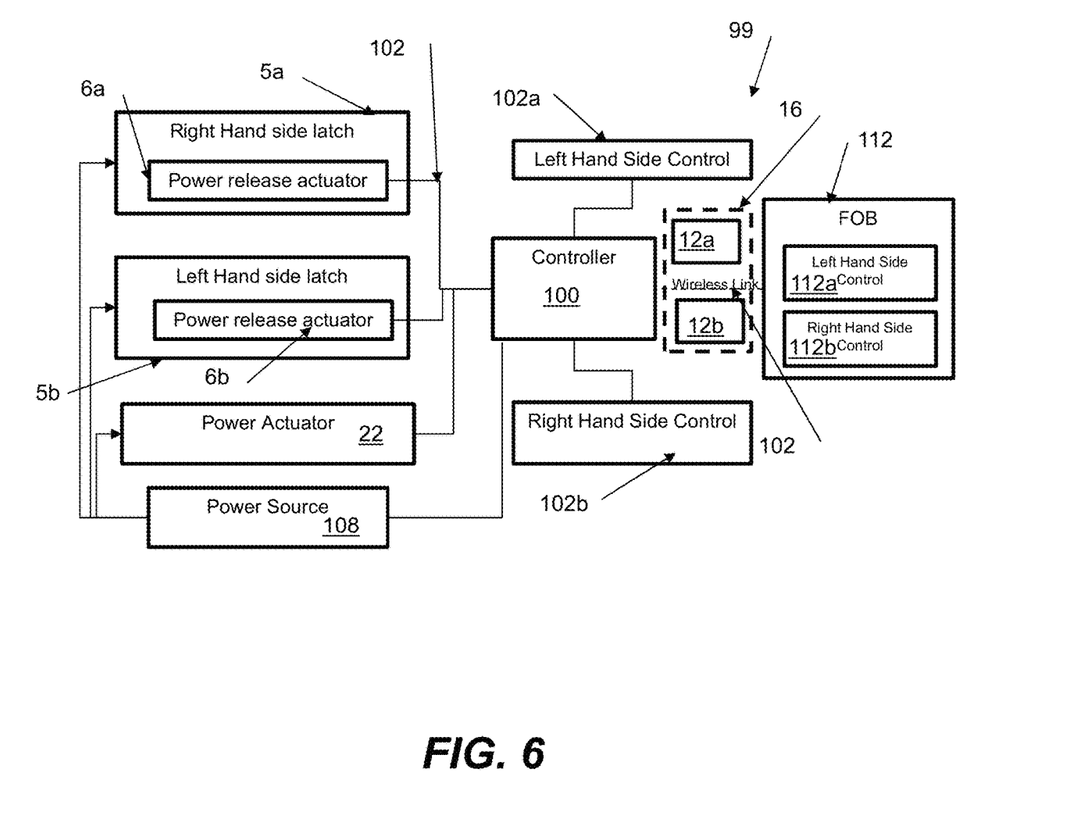
FIG. 6 shows a block diagram of a control system of FIGS. 2 and 5.

Referring to FIG. 6, shown is an example control system 99 for operation of the latching mechanism 16. The control system 99 can have one or more power release actuators 6a,6b operating in conjunction with the respective latch controls 5a, 5b. A power actuator 22 (as well as the respective power release actuators 6a,6b—e.g. for latches 12a,b acting as elatches) can be powered by a power source 108 (e.g. main battery) of the vehicle 11. The power actuator 22 can be used to power the selected operation of either the latch(es) 12a or the latch(es) 12b, in conjunction with a sided control 102a,102b as coordinated by the controller 100 (in view of the command signals 104 and/or sensor signals 106—see FIG. 5). Further, a FOB 112 can also be configured with selective controls 112a, 112b, when communicating wirelessly with the controller 100. In short, the example control system 99 facilitates a side 19a,b loading configuration for the closure panel 13 operation, which permits side loading by pivoting the closure panel 13 from one of the sides 19a,b at a time. In other words, for the side 19a,b not opening, the latches 12 positioned on the closed side 19a,b act as the hinges for the closure panel 13 e.g. the mating latch component 14 rotates in the slot 17 (about pivot 17a—see FIG. 8) of the ratchet 40 while at the same time the mating latch component 14 remains retained by the slot 17.

Figure 7:
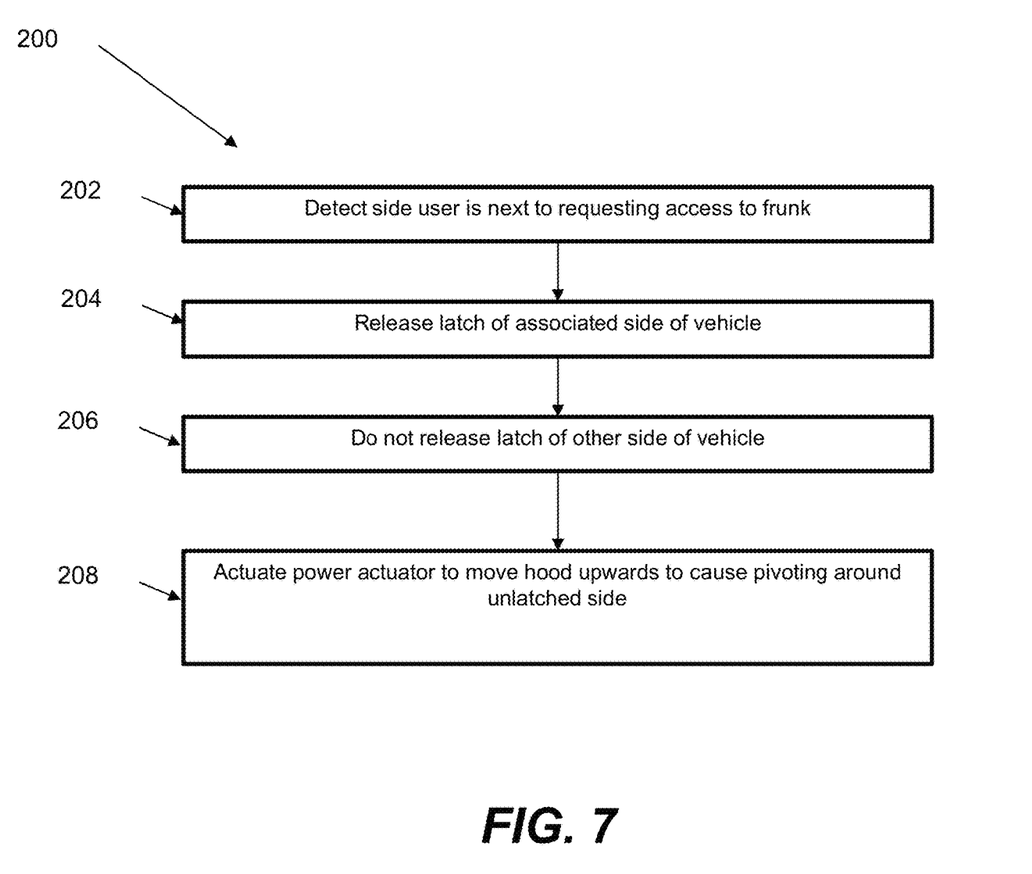
FIG. 7 is an example operation of the mechanism of FIGS. 2 to 6.

Referring to FIG. 7, a method for operating a latching mechanism 16 for facilitating opening and closing of a closure panel 13 of a vehicle 11, the method comprising the steps of: receiving 202 an open signal 104 pertaining to one side 19a, 19b of the vehicle 11; unlatching 204 a first latch 12a mounted in a first location 8a to one of a body 10 of the vehicle 11 and the closure panel 13, the first location 8a positioned on a first side 19a of the vehicle 11, the first latch 12a coupling the closure panel 13 to the body 10 of the vehicle 11 when engaged with a corresponding first mating latch component 14a; and maintaining 206 a latched state of a second latch 12b mounted in a second location 8b to one of the body 10 and the closure panel 13, the second location 8b positioned on a second side 19b of the vehicle 11, the second latch 12b coupling the closure panel 13 to the body 10 of the vehicle 11 when engaged with a corresponding second mating latch component 14b; wherein the closure panel 13 is moved between an open position and a closed position while the second latch 12b is maintained in the latched state. Optionally, at step 208, the actuator mechanism 22 can be powered to facilitate a powered opening/closing of the closure panel 13.

Referring to FIG. 9, shown by example is an actuator mechanism 22. One embodiment as an electromechanical strut 22 including a lower housing 12', an upper housing 14', and an extensible shaft 16'. A first pivot mount 18', located at an end of lower housing 12', can be pivotally mounted to a portion of the vehicle body 10 that defines an interior cargo area 20 in the vehicle 11. A second pivot mount 20' can be attached to the distal end of extensible shaft 16' and can be pivotally mounted to the closure panel 13 of the vehicle 11. The interior of lower housing 12' is shown in greater detail. Lower housing 12' provides a cylindrical sidewall 22' defining a chamber 24'. Pivot mount 18' is attached to an end wall 26' of lower housing 12' proximal to the vehicle body (not shown). Upper housing 14' provides a cylindrical sidewall 32' defining a chamber 34' that is open at both ends. A distal end wall 28' of lower housing 12' includes an aperture 30' so that chamber 24' and chamber 34' communicate with each other. Upper housing 14' has a smaller diameter than lower housing 12'. However, it is contemplated that lower housing 12' and upper housing 14' can also be formed as a single cylinder or frusto-cone. Other form factors for lower housing 12' and upper housing 14' will occur to those of skill in the art. Upper housing 14' can be integrally formed with lower housing 12', or it can be secured to lower housing 12' through conventional means (threaded couplings, weld joints, etc.). A motor-gearbox assembly 36' is seated in chamber 24'.

Motor-gearbox assembly 36' includes an electric motor 42', a slip clutch 44', and a geared reduction gearset 46' operable for driving a rotary drive member, such as a power screw 40' associated with a spindle-type drive mechanism. Motor 42' is mounted within chamber 24' near end wall 26'. Motor 42' is secured to at least one of cylindrical sidewall 36' and end wall 26' to prevent undesired vibrations or rotation. Motor 4'2 may be a direct current bi-directional motor. Electrical power and directional control for motor 42' is provided via electrical cables that connect from the vehicle body through apertures (not shown) in end wall 26'. Clutch 44' is connected to an output shaft of motor 42'. Clutch 44' provides a selective engagement between the output shaft of motor 42' and a rotary input component of reduction gearset 46'. Clutch 44' may be an electromechanical clutch that engages reduction gearset 46' when motor 42' is activated. When clutch 44' is engaged, torque is transferred from motor 42' to reduction gearset 46'. When clutch 44' is disengaged, torque is not transferred between motor 42' and reduction gearset 46' so that no back drive occurs if, for example, closure panel 13 is closed manually. Clutch 44' may also be a passive torque-limiting friction clutch configured to disconnect motor 42' from reduction gearset 46' when manual operation of closure panel 13 occurs. As an optional arrangement, clutch 44' could be operably disposed between an output component of gearset 46' and power screw 40'.

Reduction gearset 46' provides speed reduction and torque multiplication for power screw 40'. Reduction gearset 46' is configured as a planetary gearset having a ring gear 50' driven by the output of clutch 44'. In turn, a number of planet gears 52' transfer power from ring gear 50' to power screw 40' via an output gear 51', which is centrally disposed within planetary gearset 46', for providing the desired gear ratio reduction to power screw 40'. Output gear 51' acts as a sun gear in planetary gearset 46'. In the present embodiment, planetary gearset 46' provides about a 47:1 gear ratio reduction. Other gear ratio reductions will occur to those of skill in the art. Power screw 40' extends into upper housing 14'. A coupling unit 53' interconnects output gear 51' of planetary gearset 46' to an input segment of power screw 40'. Coupling unit 53' may provide for and accommodate misalignment between output gear 51' and power screw 40' while providing a damping feature to minimize shock loading. Coupling unit 53' and slip clutch 44' may be integrated into a common assembly to provide enhanced functionality and improved packaging efficiency.

Extensible shaft 16' has a cylindrical sidewall 54' defining a chamber 56' and is concentrically mounted between upper housing 14' and power screw 40'. As described earlier, second pivot mount is attached to the distal end of extensible shaft 16'. The proximal end of extensible shaft 16' is open. A drive nut 58', also associated with the spindle-type drive mechanism, is mounted around the proximal end of extensible shaft 16' relative to lower housing 12' and is threadedly coupled with power screw 40' in order to convert the rotational movement of power screw 40' into the linear motion of extensible shaft 16' along the axis of power screw 40'. The combination of threaded power screw 40' and threaded drive nut 58' defines the rotary-to-linear conversion device and, more particularly, the threaded spindle-type drive assembly. More specifically, internal threads formed in drive nut 58' are in threaded engagement with external threads formed on power screw 40'. Drive nut 58' includes two external splines 60' that extend into opposing coaxial slots 62' formed on the inside of upper housing 14' to prevent drive nut 58' from rotating. The length of slots 62' defines the retracted and the extended positions of extensible shaft 16'. Alternatively, a spindle drive assembly could be used in electromechanical strut 22 having an internally-threaded drive nut 58' driven by the output of planetary gearset 46' and threadedly meshed with an externally-threaded power screw 40' connected to extensible shaft 16'. As a further alternative, a ballscrew drive assembly could be used in lieu of the spindle drive assembly without departing from the scope of the invention. An integrally-formed outer lip 64' in upper housing 14' provides an environmental seal between chamber 34' and the outside.

A spring housing 38' is provided in lower housing 12' and is defined by cylindrical sidewall 22', end wall 28', and a flange 66'. Within spring housing 38', a power spring 68' is coiled around power screw 40', providing a mechanical counterbalance to the weight of closure panel 13. Preferably formed from a strip of steel, power spring 68' assists in raising closure panel 13 both in its powered and unpowered modes. One end of power spring 68' is attached to power screw 40' and the other is secured to a portion of cylindrical sidewall 22'. When extensible shaft 16' is in its retracted position, power spring 68' is tightly coiled around power screw 40'. As power screw 40' rotates to extend extensible shaft 16', power spring 68' uncoils, releasing its stored energy and transmitting an axial force through extensible shaft 16' to help raise closure panel 13. When power screw 40' subsequently rotates to retract extensible shaft 16', power spring 68 recharges by recoiling around power screw 40'

Power spring 68' stores sufficient energy when coiled to drive power screw 40' to fully raise closure panel 13, even when motor-gear assembly 36' is not engaged (typically by unlatching closure panel 13 to raise it manually.) In addition to assisting to drive power screw 40', power spring 68' provides a preloading force that reduces starting resistance and wear for motor 42'. Furthermore, power spring 68' provides dampening assistance when closure panel 13 is closed. Unlike a gas strut, power spring 68' is generally not affected by temperature variations, nor does it unduly resist manual efforts to close closure panel 13. Although the present embodiment describes power spring 68' that uncoils to assist in raising closure panel 13 and recoils to lower closure panel 13, it has been contemplated that a power spring 68' could be provided that uncoils when lowering the lift gate and recoils when raising the closure panel 13.

I claim:

1. A latching mechanism (16) for facilitating opening and closing of a closure panel (13) of a vehicle (11), the latch mechanism comprising:
    a first latch (12*a*) mounted in a first location (8*a*) to one of a body (10) of the vehicle and the closure panel, the first location positioned on a first side (19*a*) of the vehicle, the first latch coupling the closure panel to the body of the vehicle when engaged with a corresponding first mating latch component (14*a*);
    a second latch mounted in a second location (8*b*) to one of the body and the closure panel, the second location positioned on a second side (19*b*) of the vehicle, the second latch coupling the closure panel to the body of the vehicle when engaged with a corresponding second mating latch component (14*b*);
    wherein one of the first latch and the second latch is maintained in a latched state and the other of the first latch and the second latch is in an unlatched state when the closure panel is moved between an open position and a closed position;
    wherein the closure panel is moved between the open position and the closed position while the first latch is maintained in the latched state and the second latch is in the unlatched state;
    wherein a ratchet (40) of the first latch retains a mating latch component (14*a,b*) in a slot (17) as the mating latch component pivots about a pivot axis (17*a*) of the slot.

2. The latching mechanism of claim 1; wherein the closure panel is moved between the open position and the closed position while the second latch is maintained in the latched state and the first latch is in the unlatched state.

3. The latching mechanism of claim 2; wherein a ratchet of the second latch retains a mating latch component in a slot (17) as the mating latch component pivots about a pivot axis (17a) of the slot.

4. The latching mechanism of claim 1; wherein the first latch and the second latch are mounted on the body and the first mating latch component and the second mating latch component are mounted on the closure panel.

5. The latching mechanism of claim 1 further comprising an actuator mechanism (22) coupled between the body and the closure panel in a third location (8c), the third location between the first location and the second location, the actuator mechanism for facilitating movement of the closure panel between the open position and the closed position.

6. The latching mechanism of claim 1, wherein the closure panel covers a storage compartment (20) of the vehicle.

7. The latching mechanism of claim 6, wherein the closure panel is for enclosing a frunk as the storage compartment of the vehicle.

8. The latching mechanism of claim 6; wherein the storage compartment is located adjacent to a front (1) of the vehicle, such that the first side and the second side extend between the front and a back of the vehicle.

9. The latching mechanism of claim 1; wherein the first latch is a first pair of latches and the second latch is a second pair of latches.

10. A control system for operating a latching mechanism (16) for a closure panel of a vehicle, the latching mechanism having a first latch (12a) mounted to one of a body of the vehicle and the closure panel on a first side of the vehicle and a second latch (12b) mounted to one of the body and the closure panel on a second side of the vehicle, the control system having:
 a controller (100) for coordinating the release of the first latch to an unlatched state while providing for the second latch in a latched state;
 a first side control (102a) coupled to the controller for operating the first latch; and
 a second side control (102b) coupled to the controller for operating the second latch;
 wherein the second latch is maintained in the latched state and the first latch is in the unlatched state when the closure panel is moved between an open position and a closed position;
 wherein a ratchet (40) of the second latch retains a mating latch component (14b) in a slot (17) as the mating latch component pivots about a pivot axis (17a) of the slot.

11. The control system of claim 10, wherein the first latch and the second latch each have a power release actuator (6a,6b) for operating the first latch and the second latch as elatches.

12. The control system of claim 10, wherein a signal connection between the controller and the first side controller is a wireless connection.

13. The control system of claim 10, wherein a signal connection between the controller and the first side controller is a wired connection.

14. The control system of claim 10, wherein a signal connection between the controller and the second side controller is a wireless connection.

15. The control system of claim 10, wherein a signal connection between the controller and the second side controller is a wired connection.

16. The control system of claim 10, wherein the controller is configured to operate an actuator mechanism (22) coupled between the body and the closure panel in an intermediate location between the first side and the second side, the actuator mechanism for facilitating movement of the closure panel between the open position and the closed position.

17. A method for operating a latching mechanism (16) for facilitating opening and closing of a closure panel (13) of a vehicle (11), the method comprising the steps of:
 unlatching a first latch (12a) mounted in a first location (8a) to one of a body (10) of the vehicle and the closure panel, the first location positioned on a first side (19a) of the vehicle, the first latch coupling the closure panel to the body of the vehicle when engaged with a corresponding first mating latch component (14a); and
 maintaining a latched state of a second latch mounted in a second location (8b) to one of the body and the closure panel, the second location positioned on a second side (19b) of the vehicle, the second latch coupling the closure panel to the body of the vehicle when engaged with a corresponding second mating latch component (14a);
 wherein the closure panel is moved between an open position and a closed position while the second latch is maintained in the latched state
 wherein a ratchet of the second latch retains a mating latch component in a slot as the mating latch component pivots about a pivot axis of the slot.

\* \* \* \* \*